(No Model.)
S. BABCOCK.
MACHINE FOR SAWING CLAPBOARDS OR RIFT SIDING.
No. 273,701. Patented Mar. 13, 1883.
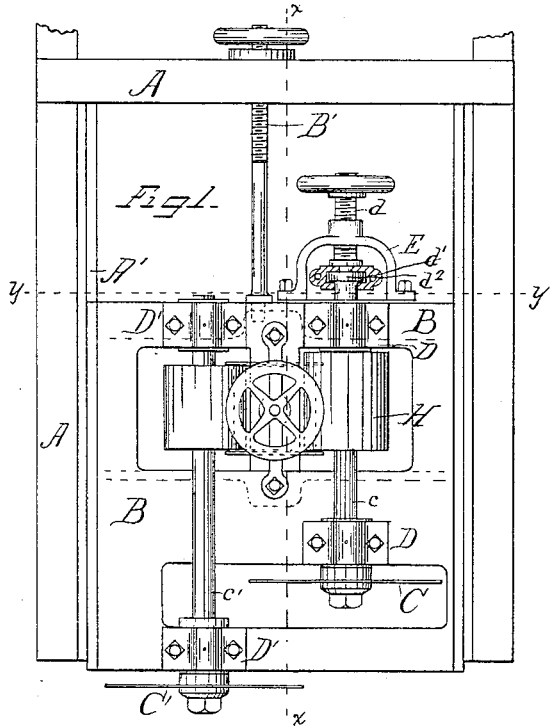
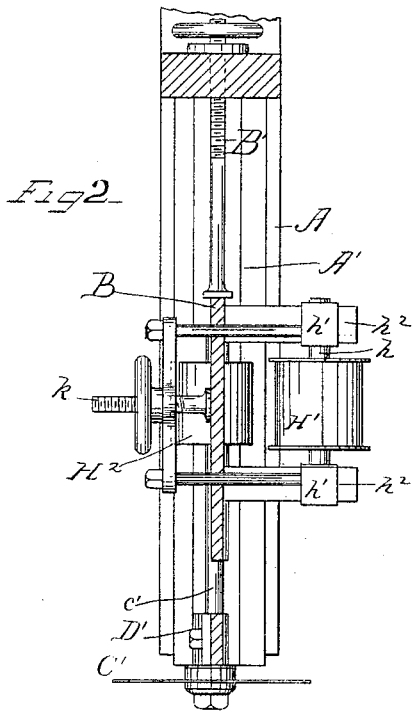
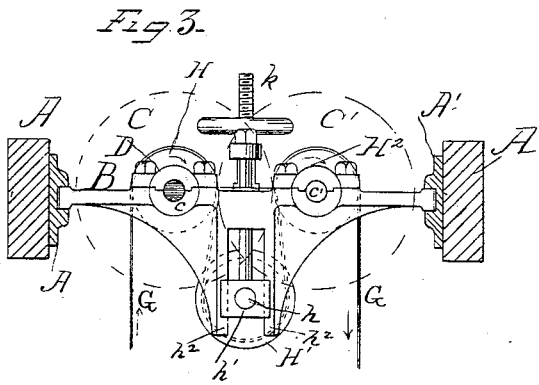
Witnesses
S. Everett Brown
A. H. Munday
Inventor
Simeon Babcock,
per Munday, Evarts & Adcock
his Attorneys.

UNITED STATES PATENT OFFICE.

SIMEON BABCOCK, OF MANISTEE, MICHIGAN.

MACHINE FOR SAWING CLAPBOARDS OR RIFT SIDING.

SPECIFICATION forming part of Letters Patent No. 273,701, dated March 13, 1883.

Application filed August 7, 1882. (No model.)

*To all whom it may concern:*

Be it known that I, SIMEON BABCOCK, of Manistee, in the county of Manistee, in the State of Michigan, have invented certain new and useful Improvements in Machines for Sawing Clapboards or Rift Siding, of which the following is a specification.

My invention relates to improvements upon the machine for which I have heretofore obtained Letters Patent of the United States, No. 232,326, dated September 21, 1880, and more particularly to improved mechanism for severing the edges of the clapboard from the log.

In the present invention I sever the edges of the clapboard from the log as it is fed forward by means of two horizontal circular saws mounted in a vertically-adjustable frame on separate arbors, one of which is independently adjustable, and both of which are driven in the same direction by a belt passing around the arbor-pulleys and an intermediate adjustable belt-tightener pulley.

In the accompanying drawings, Figure 1 is a side elevation of a device embodying my invention. Fig. 2 is a vertical section on line $x$ $x$ of Fig. 1; and Fig. 3 is a cross-section on line $y$ $y$ of Fig. 1.

In the drawings, A represents the portion of the stationary frame-work of the mill or machine in which the adjustable frame B is mounted and adjusted up and down by means of the screw B', as occasion may require in sawing logs of different sizes. The adjustable frame B, I make, or prefer to make, of cast-iron, and it moves up and down in the guides A', secured to the frame A.

C and C' are the two horizontal saws, secured to the separate arbors $c$ and $c'$, which are mounted in suitable bearings, D and D', in the adjustable frame B. The upper of these saws, C, severs the upper edge of the clapboard or removes the sap, and the lower saw, C', severs the clapboard from the log. The arbor $c$ may be independently adjusted in the frame B by means of the adjusting-screw $d$, mounted in the brace E on the frame B, and provided with the boxing $d'$ on its end, which incloses the head $d^2$ of the arbor $c$. By thus adjusting the saw C to different vertical distances from the saw C', the clapboards may be made of any width desired. The saws C and C' are both driven in the same direction by means of a belt, G, which passes around the pulley H on the arbor $c$, intermediate pulley, H', on the adjustable shaft $h$, and thence back around the pulley H² on the arbor $c'$ to the driving-pulley, which, however, is not shown in the drawings. The shaft $h$ of the intermediate pulley is mounted in suitable sliding bearing, $h'$, supported on the guides $h^2$, secured to or forming part of the frame B; and it is adjusted laterally, so as to give the requisite tension to the driving-belt, by means of the adjusting-screw $k$.

I have not herein shown or described the main saw or the devices for adjusting and supporting the log or other parts of the clapboard-machine to which my invention is applied and relates, as I have not deemed a description of such parts necessary to a full and clear understanding of the present invention.

It will be observed that the pulley H on the adjustable arbor $c$ should be made sufficiently long to permit of the adjustment of the arbor without interfering with the operation of the belt.

I claim—

1. In a clapboard-machine, the combination, with a vertically-adjustable supporting-frame, of two horizontal saws for cutting the edges of the clapboard, said saws being mounted upon separate arbors and both being supported in said frame, substantially as specified.

2. In a clapboard-machine, the combination, with a vertically-adjustable supporting-frame, of two horizontal saws for cutting the edges of the board, said saws being mounted upon separate arbors, both being supported in said frame, and one of the arbors being independently adjustable in the frame, substantially as specified.

3. In a clapboard-machine, the combination, with two horizontal saws for cutting the edges mounted upon separate arbors in an adjustable supporting-frame, of a belt-tightener pulley, also supported in the same frame, substantially as specified.

SIMEON BABCOCK.

Witnesses:
NICHOLAS CRAMER,
W. A. GLEASON.